United States Patent [19]

Kanbe et al.

[11] Patent Number: 4,712,872
[45] Date of Patent: Dec. 15, 1987

[54] LIQUID CRYSTAL DEVICE

[75] Inventors: Junichiro Kanbe; Kazuo Yoshinaga, both of Yokohama, Japan

[73] Assignee: Canon Kabushiki Kaisha, Tokyo, Japan

[21] Appl. No.: 714,618

[22] Filed: Mar. 21, 1985

[30] Foreign Application Priority Data

Mar. 26, 1984 [JP] Japan .................... 59-58016
Mar. 28, 1984 [JP] Japan .................... 59-61336
Jul. 20, 1984 [JP] Japan .................... 59-150651

[51] Int. Cl.$^4$ .................................. G02F 1/13
[52] U.S. Cl. ............................ 350/333; 350/350 S
[58] Field of Search ............ 350/332, 333, 350 S, 350/339 R

[56] References Cited

U.S. PATENT DOCUMENTS

| | | | |
|---|---|---|---|
| 4,367,924 | 1/1983 | Clark et al. | 350/350 S |
| 4,413,883 | 11/1983 | Baraff et al. | 350/333 X |
| 4,508,429 | 4/1985 | Nagae et al. | 350/350 S |
| 4,523,811 | 6/1985 | Ota | 350/333 |
| 4,528,115 | 7/1985 | Ishii et al. | 350/332 X |
| 4,548,476 | 10/1985 | Kaneko | 350/350 S |
| 4,655,561 | 4/1987 | Kanbe et al. | 350/350 S |

*Primary Examiner*—Donald A. Griffin
*Attorney, Agent, or Firm*—Fitzpatrick, Cella, Harper & Scinto

[57] ABSTRACT

A liquid crystal device in which there is provided an element having a nonlinear voltage-current characteristic for each of picture elements of a matrix electrode construction in which the picture elements are defined at respective intersections between a scanning electrode group and a signal electrode group intercrossing the scanning electrode group and a ferroelectric liquid crystal is interposed between the scanning electrode group and the signal electrode group.

48 Claims, 25 Drawing Figures

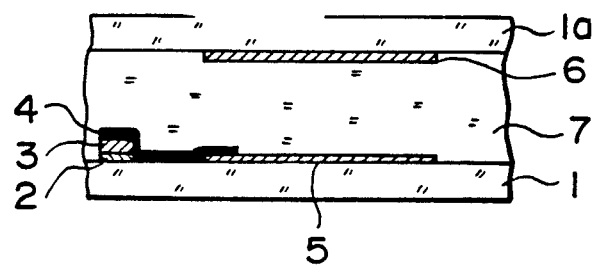
F I G. IA
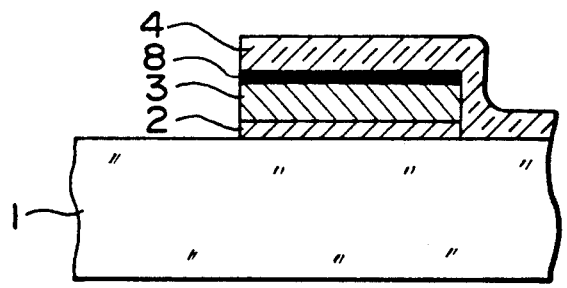
F I G. IB
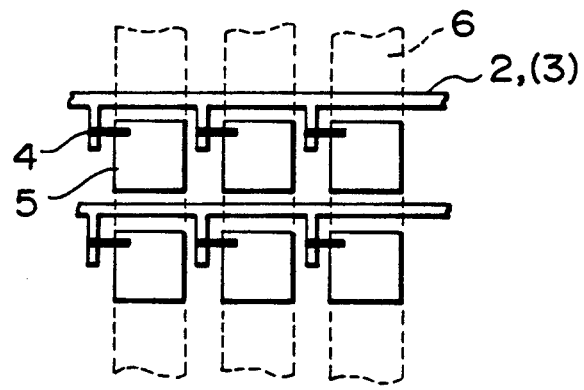
F I G. 2

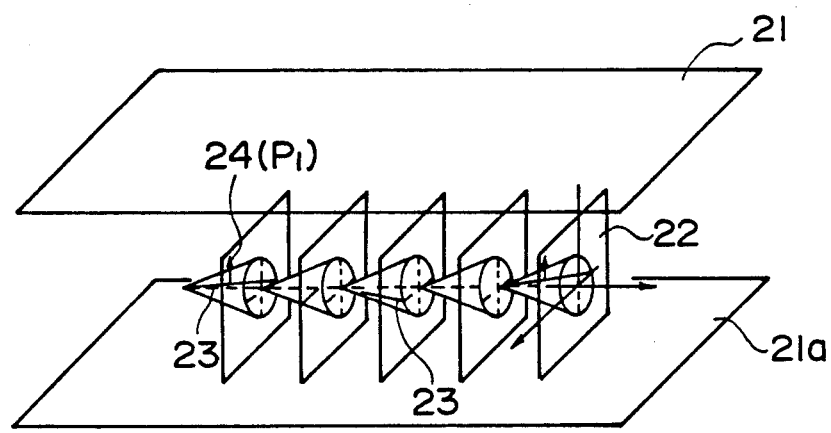
F I G. 3
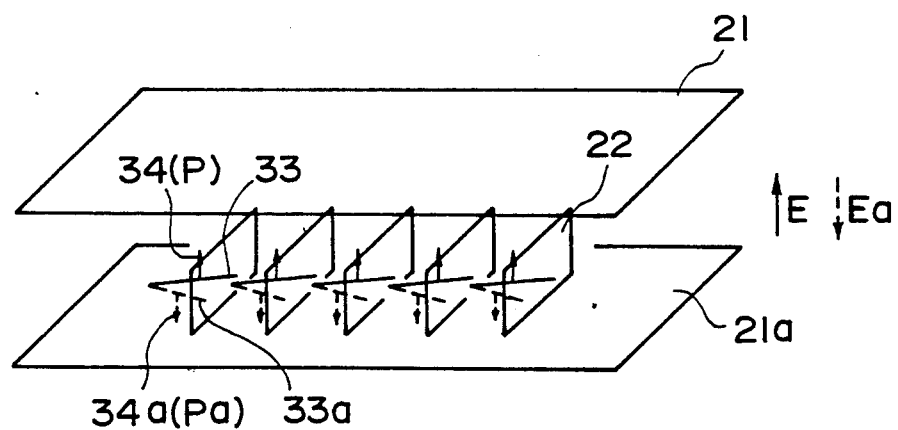
F I G. 4

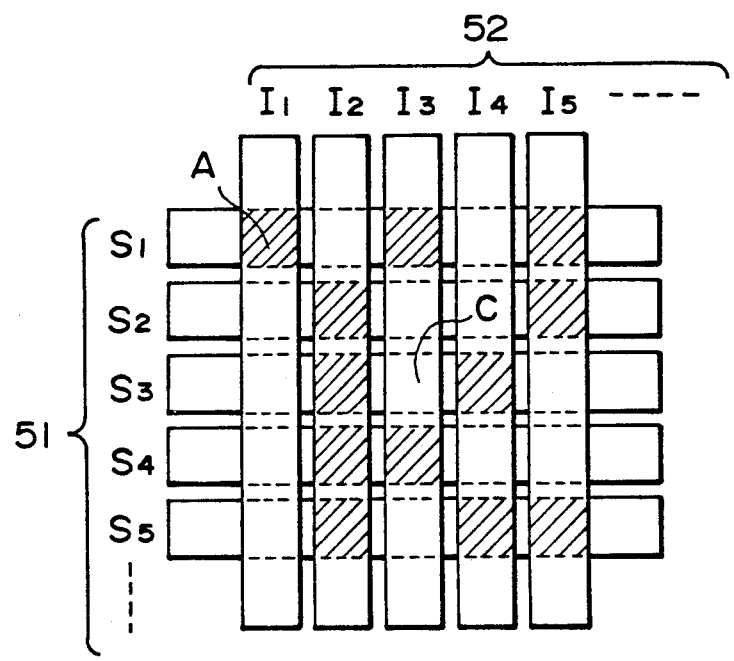
F I G. 5

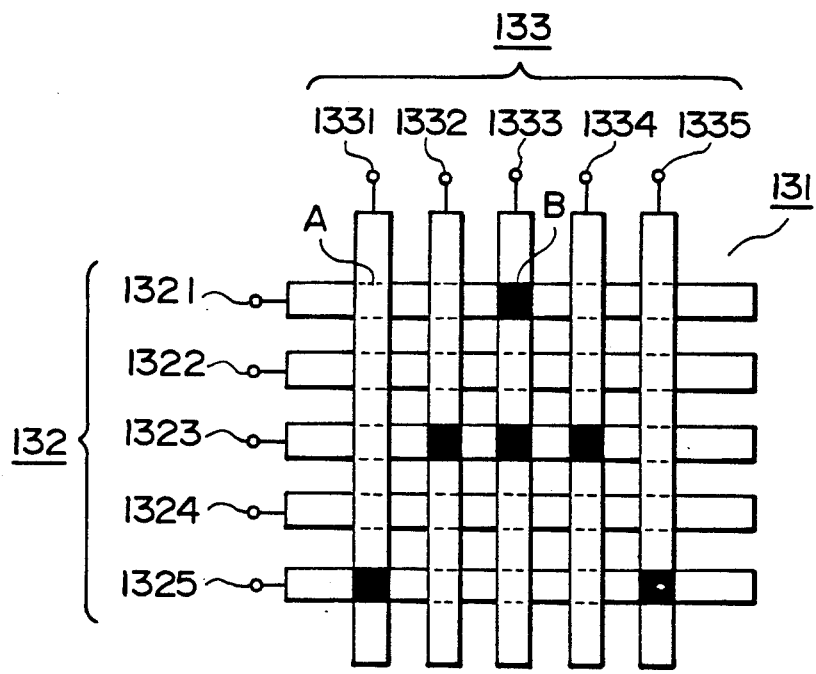
F I G. 13

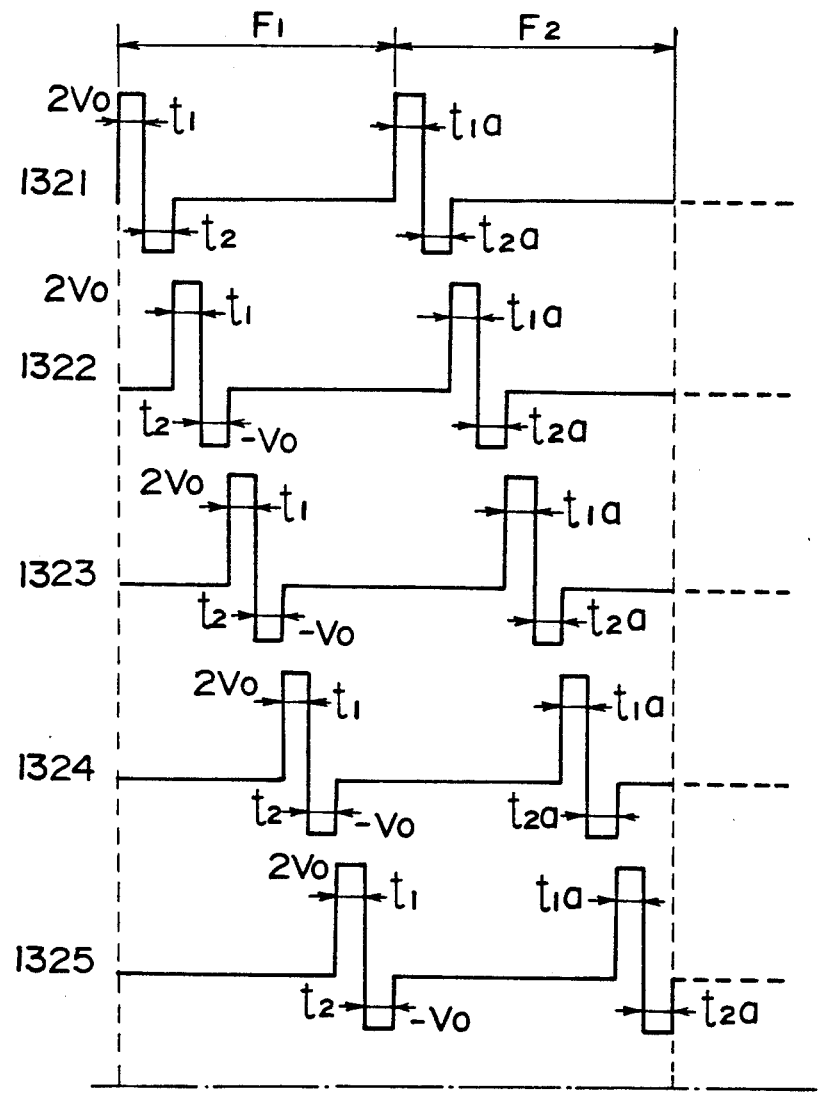
F I G. 15A

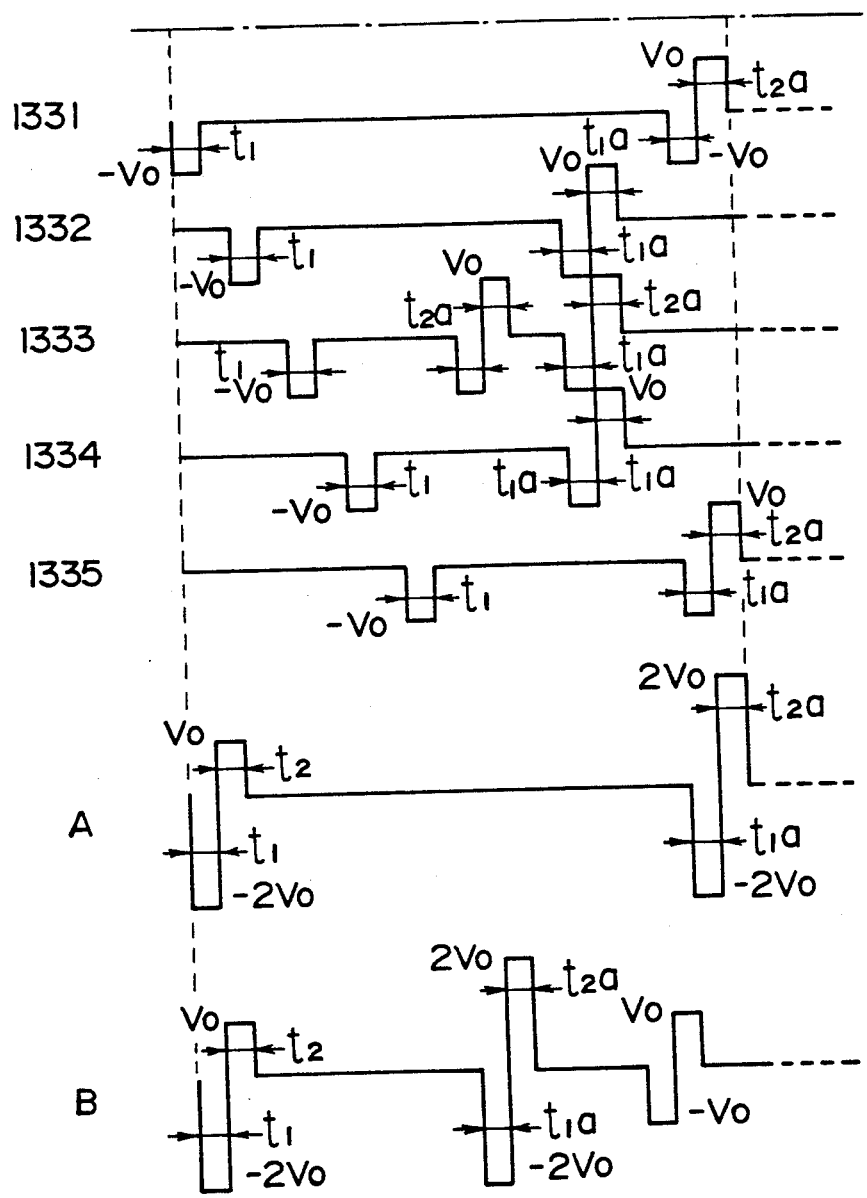
F I G. 17B 4,712,872

LIQUID CRYSTAL DEVICE

BACKGROUND OF THE INVENTION

The present invention relates to an optical modulation device such as a display device or an optical valve, and more particularly to a novel liquid crystal optical device adapted to operation of a large number of picture elements in a time-sharing member.

The following structures have been adopted to provide liquid crystal display devices in which a large number of picture elements are arranged in the form of a matrix, but they have their own defects:

(1) Simple electrode matrix:

This structure can remarkably simplify the fabrication of liquid crystal display devices, but there arises a problem that an electric field is applied even to non-selected points, resulting in crosstalk. As a result, the number of picture elements cannot be increased.

(2) Structure in which an active element such as a TFT (thin film transistor) is provided for each picture element:

Each active element can accomplish distinct switching operation so that crosstalk can be prevented, but the fabrication of active elements requires extremely precise alignment technique. As a result, when this structure is applied to the fabrication of liquid crystal devices with a large area, the cost becomes extremely high.

(3) Structure in which an MIM (Metal-Insulator-Metal)structure type nonlinear element is provided for each picture element:

If electrical matching between a nonlinear element and a liquid crystal layer corresponding to each picture element is satisfactory, crosstalk can be prevented and the number of picture elements can be increased. However, when the packing density of picture elements is increased, the electrostatic capacitance of the liquid crystal layer of each picture element is decreased so that the electrostatic capacitance of each nonlinear element must be decreased accordingly in order to obtain electrical matching. The requirement that a nonlinear element must be capable of storing charge as well as severe driving conditions presents an obstacle in respect of fabrication. Methods for driving a liquid crystal with non-linear elements are found and discussed in various papes. For instance, detailed description is contained in "The Optimization of Metal-Insulator-Metal Nonlinear Devives for Use in Multiplexed Liquid Crystal Displays", David R. Baraff et al., Transactions on Electron Devices, Vol. ED-28, No. 6, June 1981. However, even if any of the reported structures is adopted it is difficult to provide a liquid crystal display device with a large number of picture elements, and a large picture screen and relatively inexpensive liquid crystal devices have not been available so far.

SUMMARY OF THE INVENTION

In view of the above, a primary object of the present invention is to provide a novel liquid crystal device which can substantially overcome the above problems encountered in the conventional liquid crystal device, has a large number of picture elements, is capable of displaying or modulating a large picture and can be fabricated at a relative inexpensive cost.

In a liquid crystal optical device in accordance with the present invention, a ferroelectric liquid crystal is specifically used as a liquid crystal and is combined with nonlinear elements which can be fabricated by a conventional photolithographic technique so that a liquid crystal display device with a large picture area and a high picture element density hitherto unavailable in the prior art is provided.

These and other objects, features and advantages of the present invention will become more apparent upon a consideration of the following description of the preferred embodiments of the present drawings.

BRIEF DESCRIPTION OF THE DRAWINGS

FIG. 1A is a sectional view of a liquid crystal device in accordance with the present invention;

FIG. 1B is an enlarged sectional view thereof;

FIG. 2 is a schematic top view of the liquid crystal device used in the present invention comprising non-linear elements of MIM construction;

FIGS. 3 and 4 are schematic perspective views of liquid crystal devices used in the present invention;

FIG. 5 is a plan view of a picture element matrix used in a liquid crystal device in accordance with the present invention;

FIG. 13 is a plan view of a picture element matrix used in a liquid crystal device in accordance with the present invention;

DESCRIPTION OF THE PREFERRED EMBODIMENTS

Figure 6:
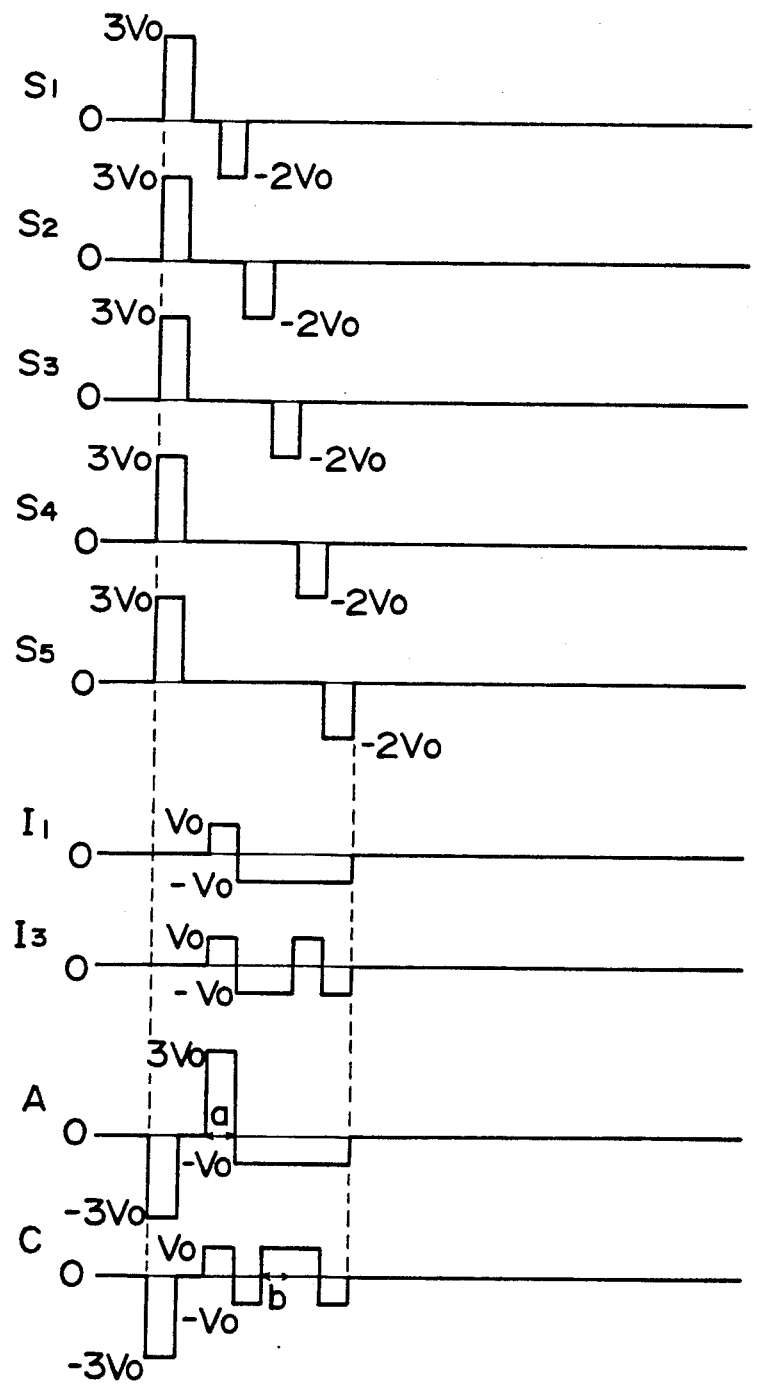
FIGS. 6, 7, 8, 9, 10, 11 and 12 are respectively views used to explain driving methods in accordance with the present invention.

The ferroelectric liquid crystal used in the liquid crystal optical device in accordance with the present invention has two polarized states each having memory or storage capability so that the following remarkable effects can be obtained.

In a conventional liquid crystal device comprising a conventional liquid crystal (for instance, a twisted nematic liquid crystal) and nonlinear elements (those having a nonlinear voltage-current characteristic), in response to a picture element ON signal, a nonlinear element is driven into the ON state so that charge is stored at both ends of a liquid crystal layer, a voltage is applied and a liquid crystal corresponding to a picture element is driven into the ON state. When the signal is turned OFF, the nonlinear element is driven into the OFF state and the charge stored at both ends of the liquid crystal layer is divided in capacitance into an electrostatic capacitance of the nonlinear element and an electrostatic capacitance of the liquid crystal layer. Therefore, when the electrostatic capacitance of the nonlinear element is not sufficiently lower than that of the liquid crystal layer, the quantities of charge at both ends of the liquid crystal layer are reduced so that it becomes now impossible to maintain the liquid crystal corresponding to the picture element in the ON state. It follows therefore that in the conventional liquid crystal devices, the electrostatic capacitance of the nonlinear element must be in general 1/10 or less of that of the liquid crystal layer. If the electrostatic capacitance of the nonlinear element should be higher than 1/10 of that of the liquid crystal layer, a latitute in driving conditions is extremely narrowed. Therefore, when the picture elements are increased in density, the electrostatic capacitance of the picture element liquid crystal is decreased so that the electrostatic capacitance of the nonlinear element must be further decreased. As a result, it has been extremely difficult to fabricate such minute nonlinear elements by the conventional photolithographic techniques.

Meanwhile, when the electrostatic capacitance of the nonlinear element is sufficiently made lower than that of the picture element liquid crystal, a voltage applied to the liquid crystal layer due to the charge accumulated at both ends of the liquid crystal layer is almost completely applied to the nonlinear element when the latter is turned OFF in response to the OFF signal. As a result, when a threshold voltage of the nonlinear element is lower than a voltage (a threshold voltage of a liquid crystal) required for switching the liquid crystal layer from the OFF state into the ON state, the nonlinear element is driven into the ON state and the charge stored on the liquid crystal layer is discharged through the nonlinear element. Alternatively, even when a threshold voltage of the nonlinear element is slightly higher than that of the liquid crystal, a voltage applied to the non-linear element is raised depending on an information signal subsequently applied to a signal electrode so that the possibility of the nonlinear element returning to the ON state is very high. Therefore, in the conventional liquid crystal devices comprising a combination of a conventional liquid crystal having no storage capability and nonlinear elements, a threshold voltage of nonlinear elements must be made considerably higher than that of the liquid crystal so that a high driving voltage must be used.

In both cases, the difficulties encountered in the fabrication of nonlinear elements as well as the severe driving methods have been hindering the conventional liquid crystal devices from attaining a high picture element density required for commercialization. However, when each of the two (ON and OFF) states of a liquid crystal layer (which correspond to the two polarized states, respectively, of a ferroelectric liquid crystal) has a memory characteristic, the liquid crystal which is switched into the ON state in response to the application of a voltage thereto can be maintained in the ON state even after the voltage applied thereto disappears. As a result, the electrostatic capacitance of each nonlinear element may be equal to or even less than that of each picture element liquid crystal so that a liquid crystal device can be driven at a high speed with a low driving voltage.

Thus, the present invention can be realized by a driving method for a liquid crystal device of the type comprising a group of scanning electrodes, a group of signal electrodes intersecting with the scanning electrodes, a ferroelectric liquid crystal interposed between the scanning electrodes and the signal electrodes, each of the intersections of the scanning electrodes and the signal electrodes defining a picture element, and a nonlinear element having a nonlinear voltage-current characteristic corresponding to each picture element, the driving method comprising: a first step in which a voltage in excess of a threshold level of one polarity is applied to the nonlinear elements corresponding to the picture elements, on a scanning electrode selected from the scanning electrode group so that the ferroelectric liquid crystal is driven into one electrically polarized state, and a second step in which a voltage in excess of a threshold level of the opposite polarity is applied to a nonlinear element selected in response to an information signal from the nonlinear elements corresponding to the picture element on the selected scanning electrode that the ferroelectric liquid crystal is driven into the other electrically polarized state.

As will be described in detail with reference to the preferred embodiments of the present invention, the driving method in accordance with the present invention uses a ferroelectric liquid crystal having two polarized states with polarities opposite to each other instead of the conventional nematic or cholesteric liquid crystals so that the present invention has a remarkable feature that a direct current is used for driving.

Most suitable ferroelectric liquid crystals used in the liquid crystal optical devices in accordance with the present invention are chiral smectic C(SmC*), H(SmH*), I(SmI*), J(SmJ*), K(SmK*), G(SmG*) or F(SmF*) phase liquid crystals. These ferroelectric liquid crystals are described in LE JOURNAL DE PHYSIQUE LETTERS, 36 (L-69), 1975, "Ferroelectric Liquid Crystals"; Submicro Second Bistable Electrooptic Switching in Liquid Crystals", Applied Physics Letters, 36(11), 1980; SOLID STATE PHYSICS, 16 (141), 1981, "Liquid Crystals", etc. These ferroelectric liquid crysals disclosed in these reports can be used in the present invention.

More particularly, examples of ferroelectric liquid crystals compounds usable in the method in accordance with the present invention include decyloxybenzylidene-p'-amino-2-methylbutyl cinnamate (DOBAMBC), hexyloxybenzylidene-p'-amino-2-chloropropyl cinnamage (HOBACPC), 4-0-(2-methyl)butylresorcilidene-4'-octylaniline (MBRA8), etc.

When these ferroelectric liquic crystals are used in the liquid crystal devices in accordance with the present invention, they are heated at temperatures so that they remain in a chiral smectic phase. Therefore, a liquid crystal device may be supported by a copper block incorporating a heater therein.

FIG. 3 is a schematic view of a ferroelectric liquid crystal cell. Reference numerals 21 and 21a denote base plates (glass plates) each coated with a transparent electrode of $In_2O_3$, $SnO_2$ or INO (Indium-Tin Oxide) and an SmC*-phase liquid crystal in which liquid crystal molecular layers 22 are oriented perpendicular to the surfaces of the glass plates 21 and 21a are hermetically sealed between the glass plates 21 and 21a. A full line 23 shows liquid crystal molecules. Each liquid crystal molecule 23 has a dipole moment ($P_\perp$) 24 in a direction perpendicular to the axis thereof. When a voltage higher than a certain threshold level is applied between the electrodes formed on the base plates 21 and 21a, a helical structure of the liquid crystal molecule 23 is loosened an unwound to change the alignment direction of respective liquid crystal molecules 23 so that the dipole moments 24 are directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions cross each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell is sufficiently thin (e.g., 1μ), the helical structure of the liquid crystal molecules is loosened even in the absence of an electric field, whereby the dipole moment assumes either of the two electrically polarized states, i.e., p in an upper direction 34 or Pa in a lower direction 34a as shown in FIG. 4. When electric field E or Ea higher than a certain threshold level and different from each other in polarity as shown in FIG. 4 is applied to a cell having the above-mentioned characteristics, the dipole moment is directed either in the upper direction 34 or in the lower direction 34a depending on the vector of the electric field E or Ea. In correspondence with this, the liquid crystal molecules are oriented in either of a first stable state 33 or a second stable state 33a. Furthermore, the first and second states retain their memory or storage capabilities even after the applied electric field disappears and can remain in the same states, respectively.

As described above, the ferroelectric liquid crystal has a memory or storage capability in an electrically polarized state so that it can be used as high-density picture elements driven by a novel method. However, in general, the threshold level is not sufficiently sharp but is dependent on the waveform of an applied voltage and more particularly on a pulse duration. Furthermore, vagueness of the threshold level is dependent on the conditions for processing the base plates, temperatures and liquid crystal materials. Thus, when it is desired to drive such a ferroelectric liquid crystal in a stable manner by a time-division system, it has now been found possible to provide a device with a high density of picture elements and a method for driving the same which can attain the maximum utilization of the memory or storage capability of the ferroelectric liquid crystal by combining it with the nonlinear elements which have a function of apparently clarifying a threshold level characteristic.

In addition to the above-described MIM (metal/insulator/metal) structure, the nonlinear elements usable in the present invention further include suitably reverse biased p-n junction diodes, p-n junction diodes connected in series in the opposite directions, suitably reverse biased Schottky diodes and Schottky diodes connected in series in the opposite directions.

FIGS. 1 and 2 schematically show the construction of a liquid crystal device in accordance with the present invention in which nonlinear elements of MIM construction are used. FIG. 1A is a sectional view of a liquid crystal device in accordance with the present invention and FIG. 1B is a sectional view, on enlarged scale, thereof showing the MIM construction. In FIGS. 1A and 1B, reference numerals 1 and 1a denote base plates (glass or plastic base plates) disposed in opposed relationship; 2, a thermally oxidized Ta(Ta$_2$O$_5$) layer of 400 Å in thickness; 3, a Ta (tantalum) layer of 2000 Å in thickness having an anode-oxidized layer 8; and 4, a Cr (chromium) conduction layer of 1000 Å in thickness. The MIM construction has a lamination of the Ta layer 3 which serves as a metal layer, the anode-oxidized Ta layer 8 which serves as an insulating layer and the Cr conduction layer 4 which serves as a metal layer. 5 is an ITO layer of 1000 Å in thickness and defines the area of one picture element. Furthermore, reference numeral 6 denotes an ITO pattern of an opposing electrode. The base plate 1 upon which is formed MIM and the base plate 2 upon which is formed a conduction pattern may be subjected to an orientation process by rubbing or by the oblique or tilt vapor deposition of a material such as SiO if so required. Reference numeral 7 denotes a ferroelectric liquid crystal (for instance, the above-described DOBAMBC) and the liquid crystal layer has a thickness of, e.g., 1.5μ. In this case, the temperature is controlled at 7° C.

FIG. 2 is a plan view of the liquid crystal device shown in FIG. 1.

FIGS. 5-12 are views for illustrating embodiments of driving in accordance with the present invention.

FIG. 5 shows a display embodiment and each picture element is provided with a nonlinear element as shown in FIG. 1, Reference numeral 51 ($S_1$-$S_5$ . . .), denotes a scanning electrode group; and 52 ($I_1$-$I_5$ . . .), a signal electrode group. It is assumed that a hatched area displays "black":, while a white area, "white".

FIG. 6 shows waveforms for illustrating a first driving embodiment, wherein $S_1$-$S_5$ are electrical signals applied to the respective scanning electrodes; $I_1$ and $I_3$ are electrical signals applied to the respective signal electrodes in response to information; and A and C are voltages (that is, the sum of a voltage applied to a nonlinear element and a voltage applied to a liquid crystal layer) applied to the respective picture elements. As is clear from FIG. 6, a pulse voltage of $3V_0$ is applied to all the scanning electrodes. As a result, a voltage of $-3V_0$ is applied to the nonlinear elements connected in series in the whole picture elements and to the liquid crystal layers. The nonlinear elements to which a voltage exceeding a threshold level is applied are driven into the ON state and a high voltage is applied to the liquid crystal layers so that the liquid crystal layers are oriented into the first electrically polarized state (representing "white"). Thereafter, a pulse voltage of $-2V_0$ is sequentially applied to the respective scanning electrodes as a scanning signal. Meanwhile, with respect to signal electrodes, a $V_0$ pulse voltage is applied for giving the information "black", and a $-V_0$ pulse voltage is applied for giving the information "white". Therefore, a voltage of $+3V_0$ is applied during a time period a (shown in the figure) to the nonlinear element and the liquid crystal layer connected series in a picture element A. It exceeds a threshold level and the nonlinear element is driven into the ON state while a positive high voltage is applied to the liquid crystal layer so that the liquid crystal layer is switched into the second electrically polarized state (representing "black"). In a picture element C, a low voltage of $+V_0$ is applied during a time period b (shown in the figure) to the nonlinear element and the liquid crystal layer connected in series so that the nonlinear element remains in the OFF state while the liquid crystal layer remains in the "white" state. During any time period except a and b, only a voltage having an absolute value $V_0$ is applied to the nonlinear element and the liquid crystal connected in series so that there arises no case where the nonlinear element is driven into the ON state and a high voltage is applied to the liquid crystal layer. Thus, a display with the "black" picture element A and the "white" picture element C is obtained.

Figure 7:
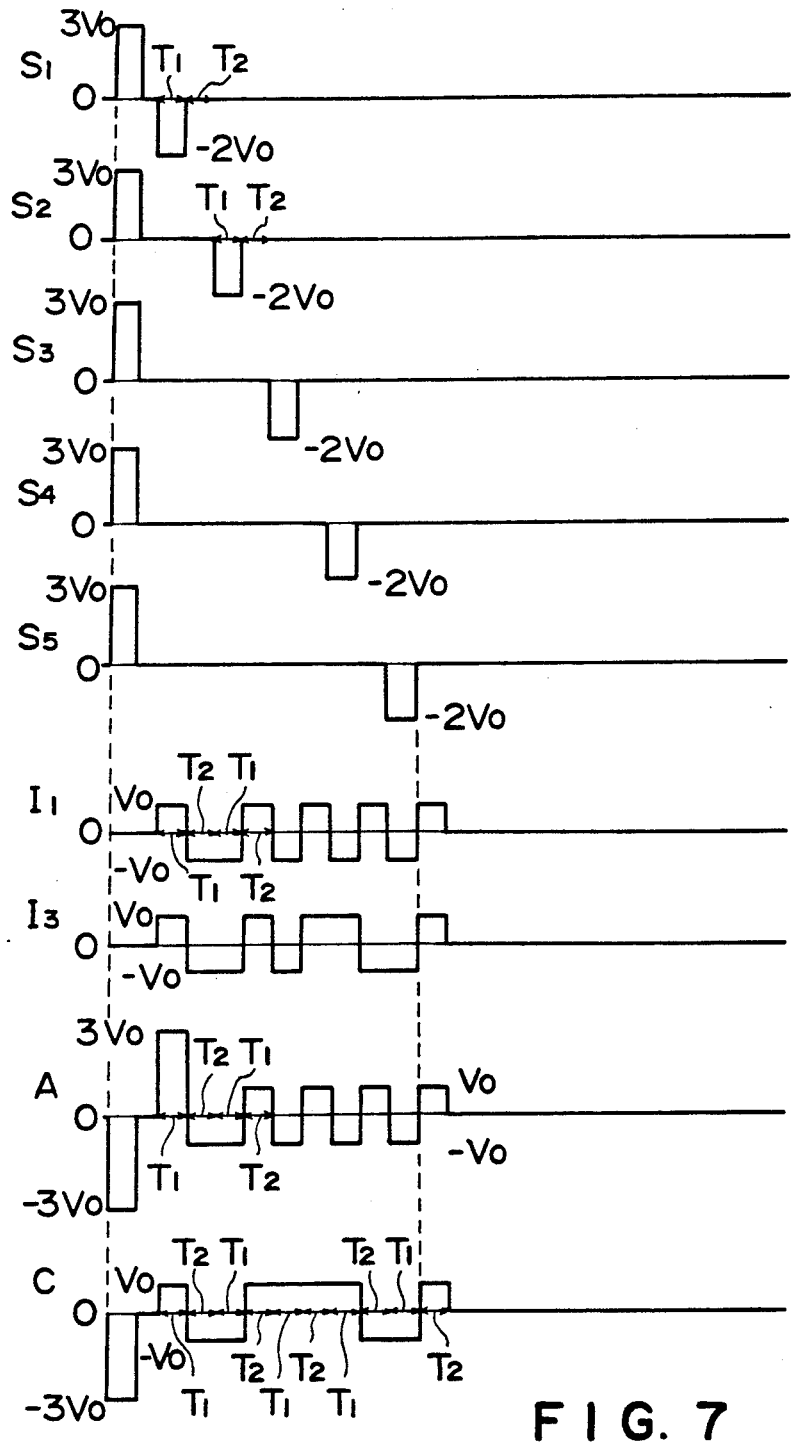

FIG. 7 shows a second driving embodiment which is substantially similar to the first embodiment except that there is provided a time period $T_2$ for applying an auxiliary signal to the signal electrodes. In the second embodiment, during a time period $T_1$, "black" is written in response to given information. Since the driving method is essentially a direct current driving method, the auxiliary signal is applied to the signal electrodes in order to avoid an undesirable state where a "black" or "white" voltage is continuously applied to the picture elements on one signal electrode so that the nonlinear elements are degraded and the liquid crystal layers are reversed to the opposite electrically polarized state. In the second embodiment, during the time period $T_2$ for applying the auxiliary signal, a voltage signal opposite to a signal applied during the writing period $T_1$ is applied.

Figure 8:
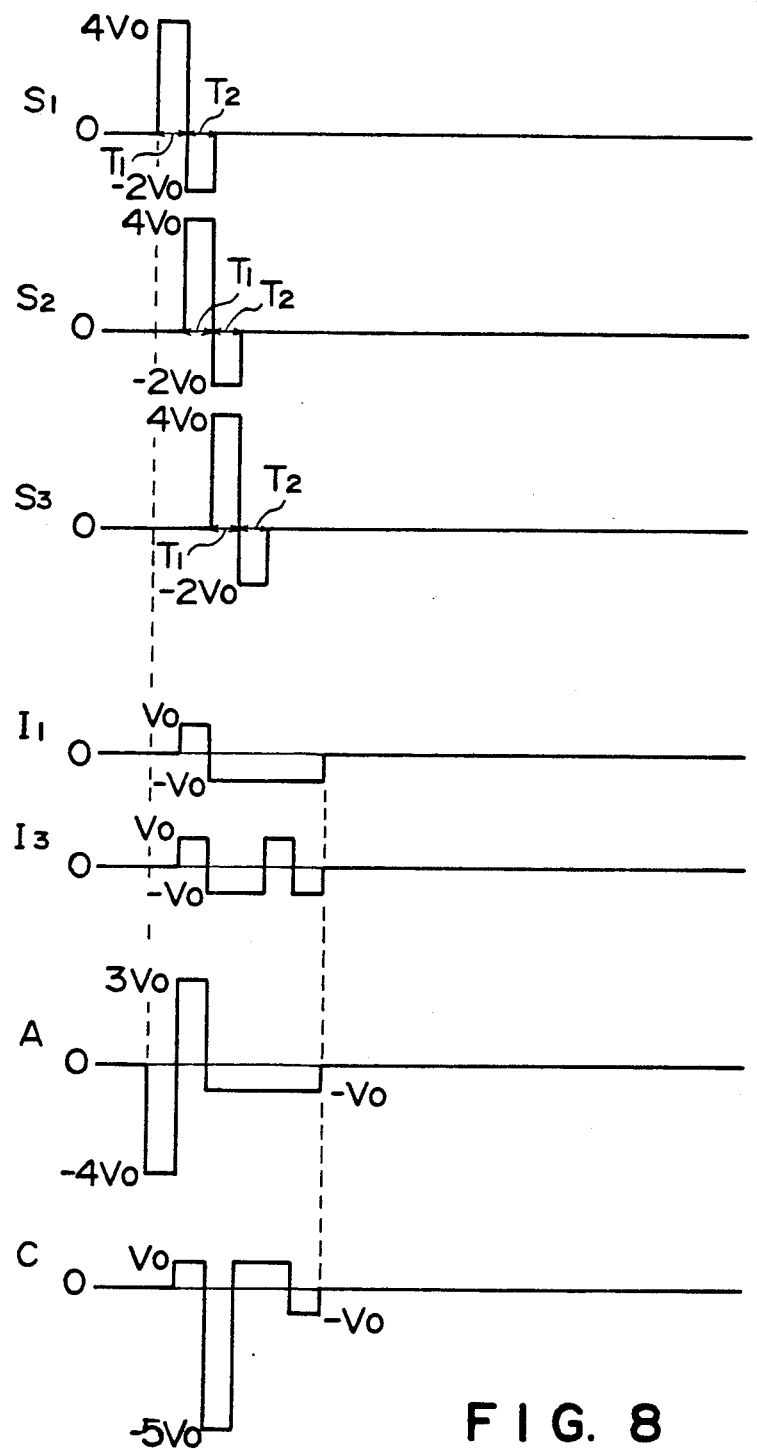

FIG. 8 shows a third driving embodiment.

In the third embodiment, a scanning signal applied to the scanning electrodes is a pulse voltage of 4 $V_0$ during the time period $T_1$ and is a pulse voltage of $-2 V_0$ during the time period $T_2$. Depending upon "black" or "white", an electrical signal applied to the signal electrode is a pulse voltage of $V_0$ or $-V_0$. As a result, a voltage of $-3V_0$ to $-5V_0$ is applied during the time period $T_1$ at each of the picture elements on a selected scanning electrode 20 that all the picture elements are once switched to "white". During the next time period $T_2$, a $+3V_0$ voltage is applied to a picture element corresponding to "black" so that the liquid crystal layer is switched again into the "black" state, but only a $+V_0$ voltage is applied to a picture element corresponding to "white" so that the picture element remains in the "white" state. As is clear from the time-series signals shown, when the picture elements are being uniformly driven into the "white" state on the N-th scanning line, "black" is being written on the (N−1)-th scanning line in response to give information.

Figure 9:
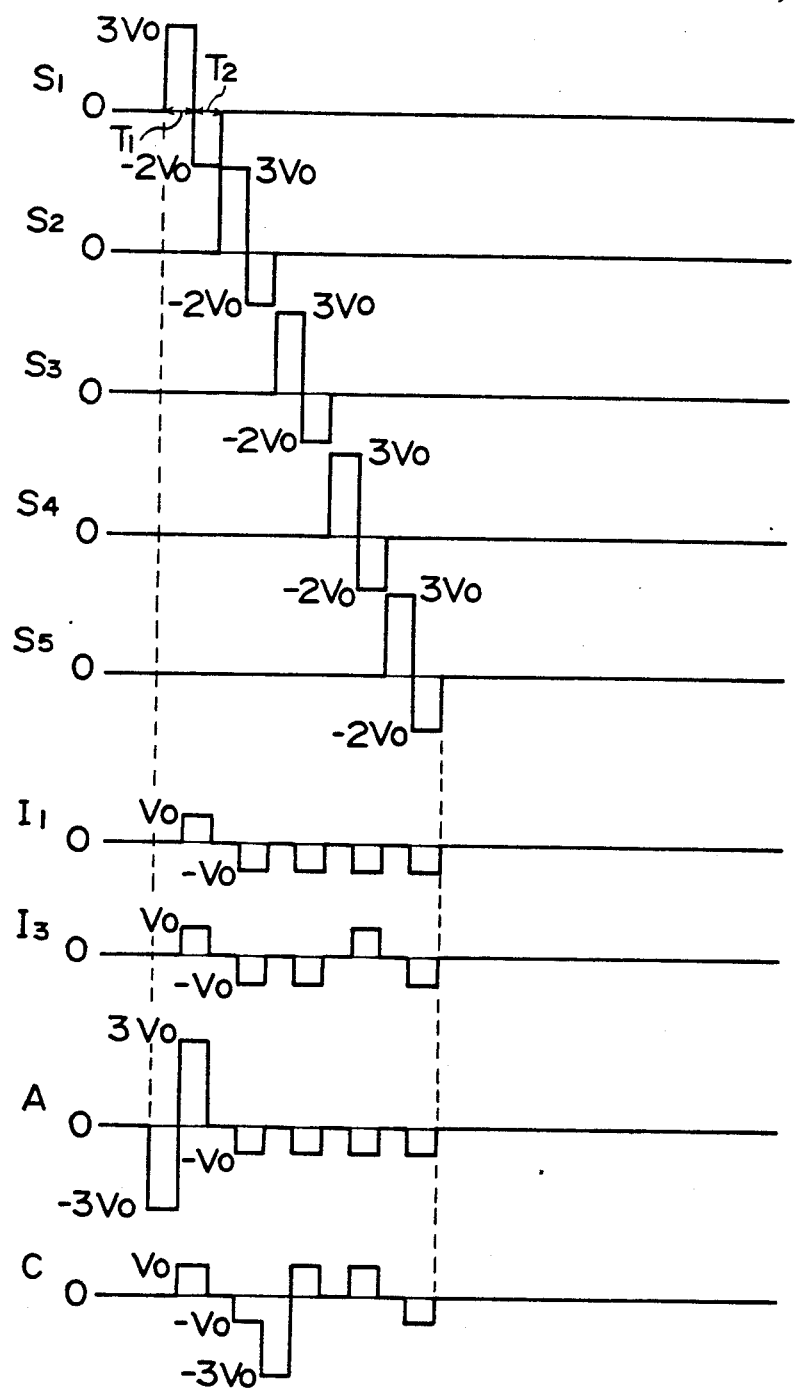

FIG. 9 shows a fourth driving embodiment. In the fourth embodiment, a scanning signal applied to the scanning electrodes is a pulse voltage of $3V_0$ during the time period $T_1$ and is a pulse voltage of $-2 V_0$ during the time period $T_2$. Meanwhile, an electrical signal applied to the signal electrodes is a $V_0$ pulse voltage corresponding to "black" or a $-V_0$ pulse voltage corresponding to "white". As a result, during the time period $T_1$, a voltage of $-3V_0$ is applied to each of the picture elements on a selected electrode so that all the picture elements are once switched to the "white" state. During the next time period $T_2$, a voltage of $+3V_0$ is applied to the picture elements corresponding to "black" so that the liquid crystal layers are switched again into the "black" state, but only a voltage of $+V_0$ is applied to the picture elements which are to represent "white" so that the picture elements remain in the "white" state. As is clear from the time-series signals shown, after the step of driving all the picture elements on one scanning line into the "white" state and the step of writing "black" on the same scanning line in response to information have been accomplished, the above-described two steps are repeated on the next scanning line.

Figure 10:
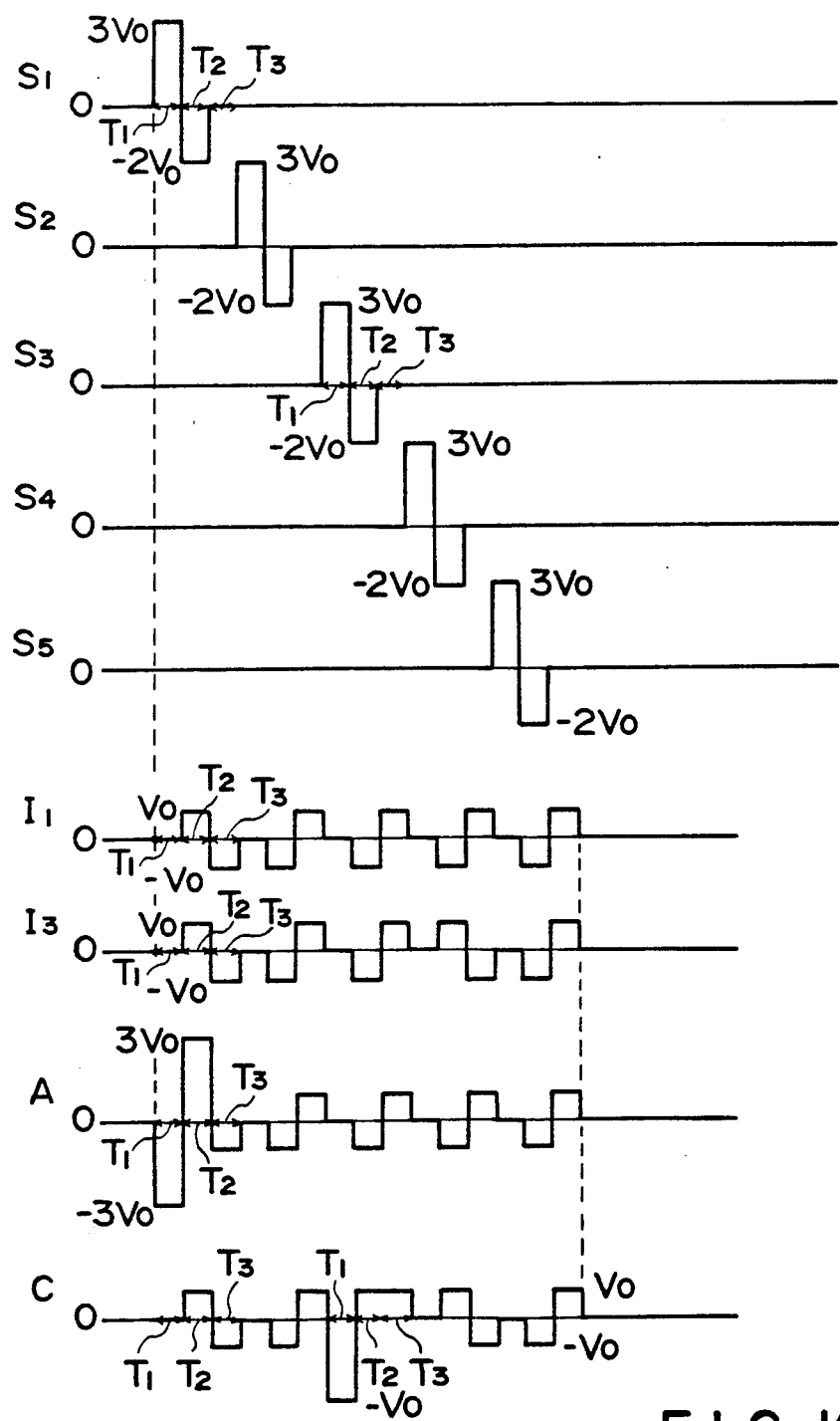

FIG. 10 shows a fifth driving embodiment of the present invention which is substantially the same as the fourth embodiment except that there is provided a time period $T_3$ for applying an auxiliary signal to the signal electrodes.

According to a further embodiment of the present invention, there is provided a driving method for a liquid crystal optical device of the type comprising a group of scanning electrodes, a group of signals intersecting with the scanning electrodes, a ferroelectric liquid crystal assuming either one of two electrically polarized states depending on an electric field applied thereto interposed between the scanning electrodes and the signal electrodes, each of the intersections of the scanning electrodes and the signal electrodes defining a picture element, and a nonlinear element having a nonlinear voltage-current characteristic corresponding to each picture element; the driving method comprising: a first phase in which a voltage in excess of a threshold level of one polarity is applied to nonlinear elements corresponding to predetermined picture elements, on a scanning electrode selected from the scanning electrode group so that the ferroelectric liquid crystal corresponding to the predetermined picture elements is driven into one polarized state, and a second phase in which a voltage in excess of a threshold level of the opposite polarity is applied to the nonlinear elements corresponding to the picture elements, different from the predetermined picture elements on the scanning electrode so that the ferroelectric liquid crystal corresponding to the different picture elements is driven into the other polarized state.

Figure 11:
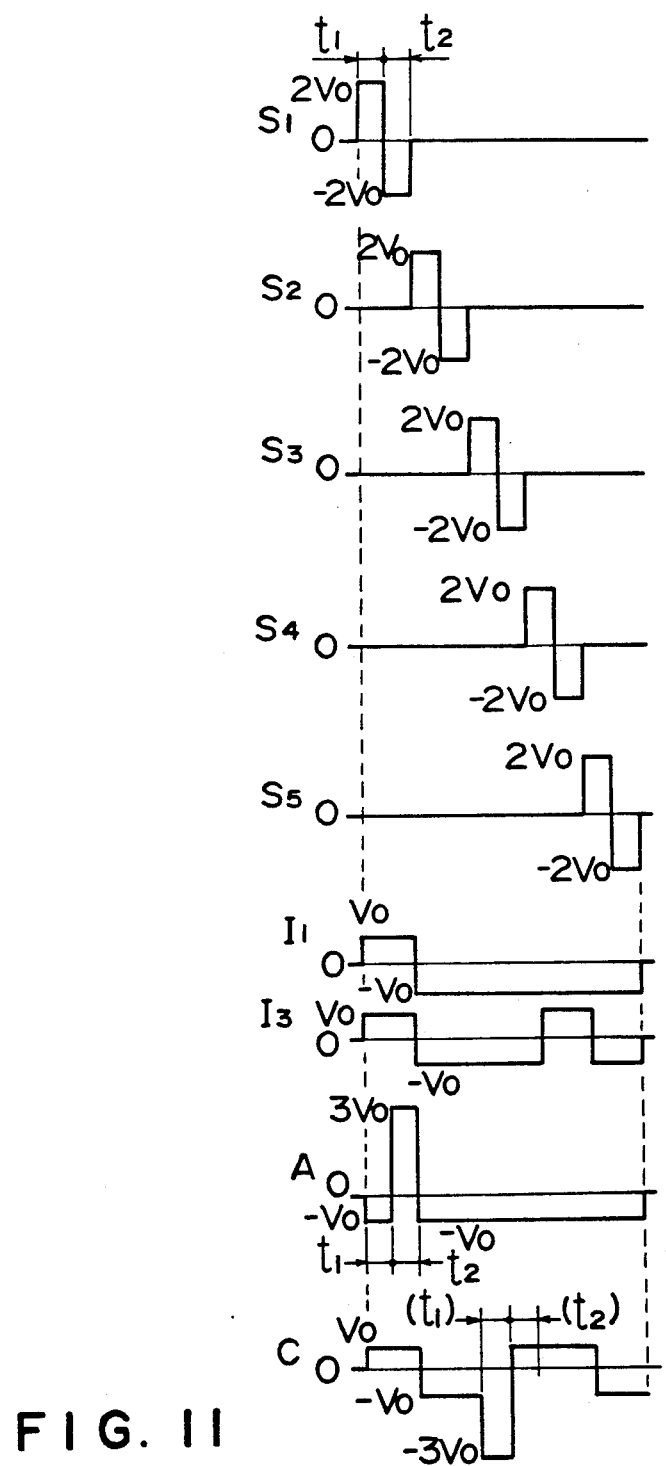

FIG. 11 shows the above-described further embodiment of the present invention. $S_1$-$S_5$ are electrical signals applied to the respective scanning electrodes; $I_1$ and $I_3$, electrical signals applied to respective signal electrodes in response to information; and A and C, voltages (that is, the sum of a voltage applied to a non-linear element and a voltage applied to a liquid crystal layer) applied to respective picture elements.

A scanning selection signal has a waveform alternating between a $2V_0$ voltage during a first phase ($t_1$) and a $-2V_0$ voltage during a second phase ($t_2$). In FIG. 11, an example of $t_1=t_2$ is shown. An electrical signal 0 is applied to a non-scanning electrode. A $+V_0$ signal in case of a "black" image and a $-V_0$ signal in case of a "white" image are applied in synchronism with the scanning signal. Therefore the total voltage of $+3V_0$ is applied to a non-linear element and a liquid crystal layer connected in series during the phase $t_1$ at a picture element A so that the voltage level exceeds a threshold level and the nonlinear element is driven into the ON state while a high positive voltage is applied to the liquid crystal layer. As a result, the liquid crystal layer is switched into the one electrically polarized state (representing "black"). At a picture element C, the total voltage of $-3V_0$ is applied to a nonlinear element and a liquid crystal layer mutually connected in series during the phase $t_{1a}$ so that the voltage exceeds the opposite threshold level and the nonlinear element is driven into the ON state while a high negative voltage is applied to the liquid crystal layer. As a result, the liquid crystal layer is switched into the other electrically polarized state (representing "white"). During any time period except the above-described specific time periods, a voltage only having an absolute value $V_0$ is applied to the nonlinear elements and the liquid crystal layer mutually connected in series at the picture element A or C so that the nonlinear element is not driven into the ON state and no high voltage is applied to the liquid crystal layer. As a result, a display with the picture element A representing "black" and the picture element C representing "white" is obtained and maintained. Therefore, a still picture memory can be obtained by scanning all the frames and a moving picture can be obtained by scanning repeatedly.

Figure 12:
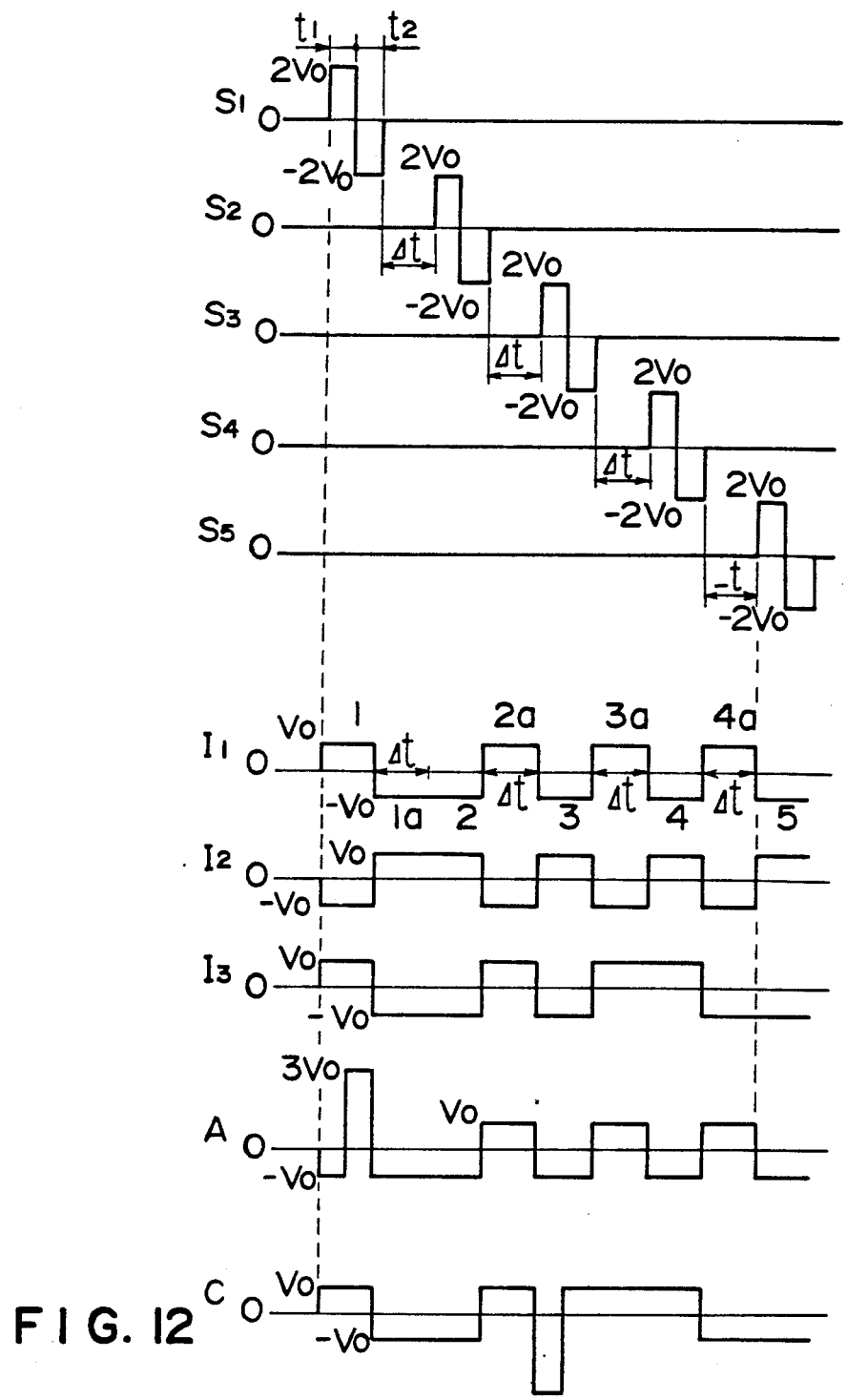

FIG. 12 shows a yet further driving embodiment which is substantially the same as the further embodiment described above except that there is provided a time period $\Delta t$ for applying an auxiliary signal to the signal electrodes. Since the driving method in accordance with the present invention is essentially a direct current driving method, the auxiliary signal is applied to the signal electrodes in order to avoid an undesirable state where a "black" or "white" voltage is continuously applied to the picture elements on one signal electrode so that the linear elements are degraded and the liquid crystal layers are reversed into the opposite electrically polarized states. In this embodiment, during the time period $\Delta t$ for applying the auxiliary signal to the signal electrodes, a signal whose polarity is opposite to that of a signal applied to a signal electrode during a whiting time period $(t_1+t_2)$ is applied.

According to a still further embodiment of the present invention, there is provided a driving method for a liquid crystal device of the type comprising a group of scanning electrodes, a group of signal electrodes intersecting with the scanning electrodes, a ferroelectric liquid crystal interposed between the scanning electrodes and the signal electrodes, each of the intersections of the scanning electrodes and the signal electrodes defining a picture element, and a nonlinear element having a nonlinear voltage-current characteristic corresponding to each picture element the driving method comprising: a first stage in which a voltage in excess of a threshold level of one polarity is applied by line sequential scanning to the nonlinear elements corresponding to the picture elements on a scanning electrode selected from the scanning electrode group so that the ferroelectric liquic crystal is driven into one electrically polarized state, and a second stage in which a voltage in excess of a threshold level of the opposite polarity is applied by line sequential scanning to a nonlinear element selected from the nonlinear elements corresponding to the picture elements on the scanning electrode so that the ferroelectric liquid crystal is driven into the other electrically polarized state.

FIG. 13 shows the above-described still further embodiment.

FIG. 13 shows an embodiment of a display with a matrix electrode construction 131. Picture elements are defined at respective intersections between a scanning electrode group 132 and a signal electrode group 133. A ferroelectric liquid crystal and a nonlinear element of the type shown in FIG. 1 are disposed at each picture element. It is assumed that black areas represent "black" while white areas represent "white" in FIG. 13.

Figure 14A:
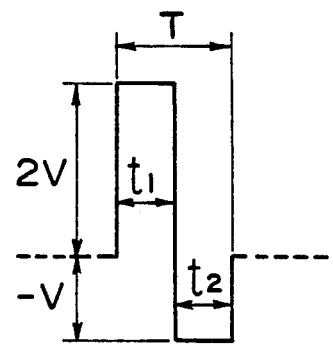
FIGS. 14A, 14B, 14C and 14D respectively show waveforms of electrical signals.
Figure 14B:
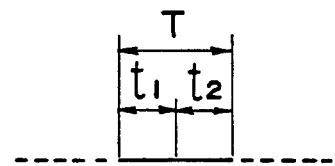

FIGS. 14A and 14B show a scanning signal in the case of selection and a scanning signal in the case of non-selection, respectively.

Figure 14C:
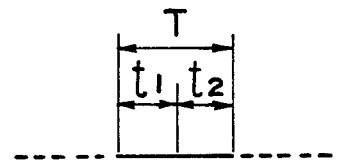
Figure 14D:
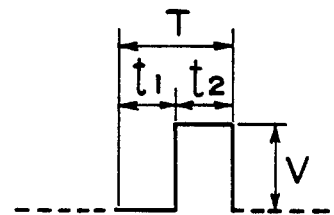

FIG. 14C shows an electrical signal for orienting a bistable ferroelectric liquic crystal into a first stable state (one electrically polarized state) and this electrical signal is referred to as "a white" signal. FIG. 14D shows an electrical signal for orienting the bistable ferroelectric liquid crystal into a second stable state (the other electrically polarized state) and this electrical signal is referred to as "black" signal.

Figure 15B:
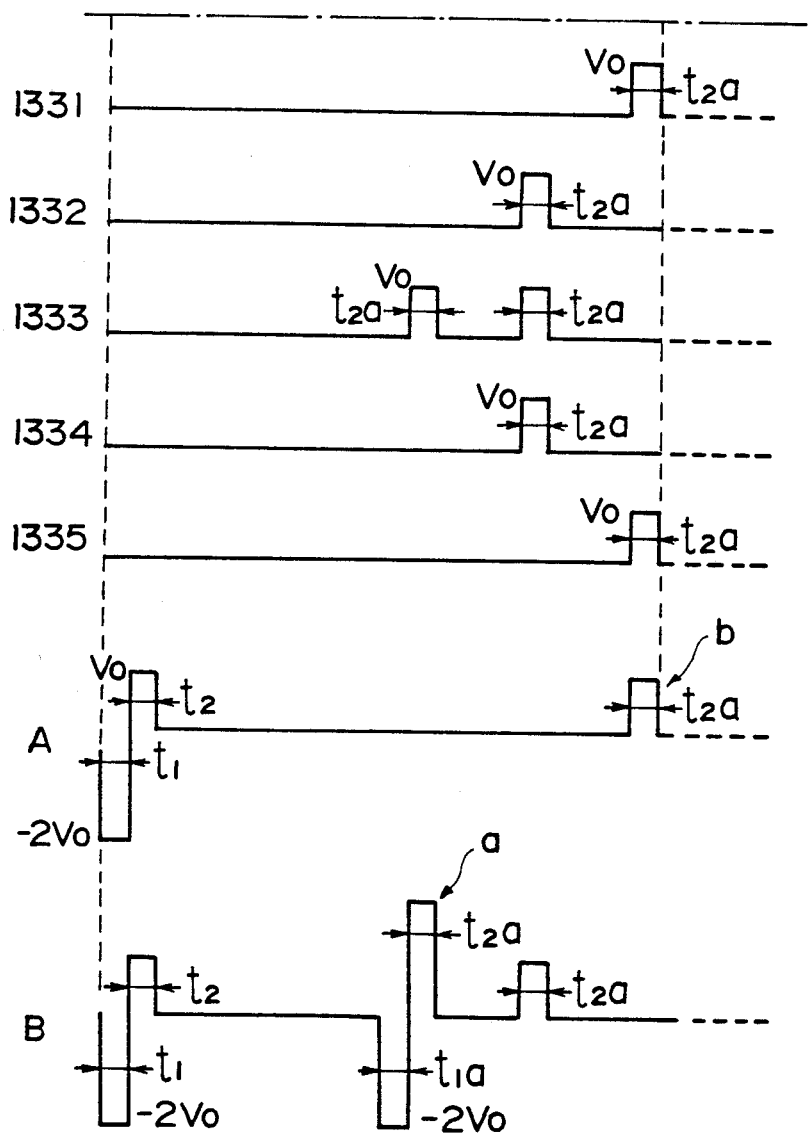
FIG. 15 (a combination of FIGS. 15A and 15B) shows voltage waveforms in the series.
Figure 15:
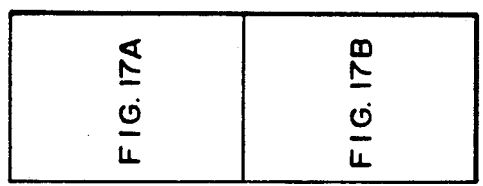

According to the driving method of the present invention, a scanning signal is applied to the whole or some of the scanning electrode group 132 during a first frame $F_1$ as shown in FIG. 15 and a "white" signal is applied to the whole or some of the signal electrodes 133 in synchronism with the scanning signal. During the next frame $F_2$, the "black" signal is applied to predetermined positions (the black picture elements) as shown in FIG. 13.

FIG. 15 (combination of FIGS. 15A and 15B) shows the electrical signals applied to the scanning electrode group 132 (1321, 1322, 1323, 1324 and 1325) and the signal electrode group 133 (1331, 1332, 1333, 1334 and 1335), respectively, and the waveforms of the voltages (each being the sum of a voltage applied to a nonlinear element and a voltage applied to a liquid crystal layer) applied to the picture elements A and B, respectively, shown in FIG. 13.

As is clear from FIG. 15, during the first frame $F_1$, a pulse voltage of $2V_0$ is first applied by line sequential scanning to the all scanning electrodes while the "white" signal is applied to the whole signal electrodes. Then, during a phase $t_1$, a voltage of $-2V_0$ is applied to a nonlinear element and a liquid crystal mutually connected in series in each picture element so that the voltage exceeds a threshold level and the nonlinear element is driven into the ON state while a high negative voltage is applied to the liquid crystal layer. As a result, the liquid crystal layer is oriented into the first electrically polarized state (white). During a phase $t_2$, $V_0$ is applied to each picture element, but the nonlinear element remains in the OFF state so that each picutre element displays "white" which has been memorized during the phase $t_1$, during the first frame $F_1$. Thereafter in a second frame $F_2$, a voltage of $2V_0$ is applied to the non-linear element and the liquid crystal mutually connected in series in, for instance, the picture element B during a time period a including a phase $t_{2a}$. Then the non-linear element exceeds a threshold level and is driven into the ON state while a high positive voltage is applied to the liquid crystal so that the liquid crystal layer is driven into the second electrically polarized state (black).

During a time period b including a phase $t_{2a}$, a low voltage as low as $+V_0$ is applied to the non-linear element and the liquid crystal layer mutually connected in series in the picture element A so that the non-linear element remains in the OFF state and the liquid crystal layer remains in the "white" state. During any time period except the time periods a and b, a voltage only having an absolute value $V_0$ is applied to the non-linear element and the liquid layer mutually connected in series so that the nonlinear element is in the OFF sate and no high voltage is applied to the liquid crystal layer. Thus, a display with the "black" picture element B and the "white" picture element A is obtained.

The voltage $V_0$ and the phase $(t_1+t_2)=T$ are depending upon a liquid crystal used and the thickness of a cell and in general the voltage $V_0$ is between 3 and 70 V and the phase T is between 0.1 μsec and 2 msec.

In order to effectively carry out the driving methods in accordance with the present invention, it is quite apparent that the electrical signal applied to the scanning or signal electrodes is not limited to the simple rectangular wave signals described above with reference to FIG. 15. For instance, a sinusoidal or triangle wave can be used for driving.

Figure 16:
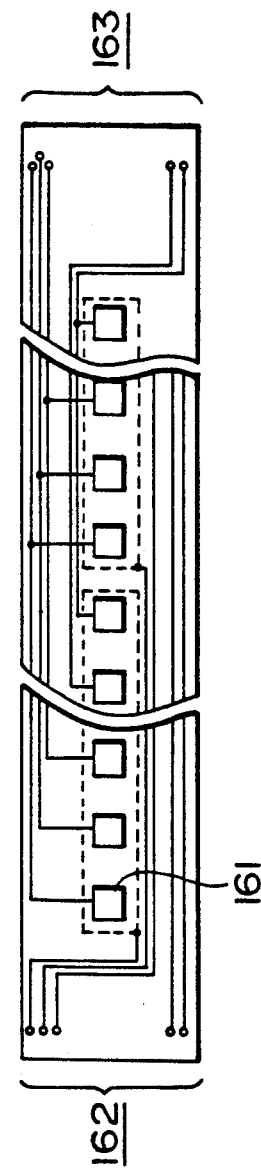
FIG. 16 is a schematic plan view of a liquid crystal optical shutter to which is preferable applied a driving method in accordance with the present invention.
Figure 17A:
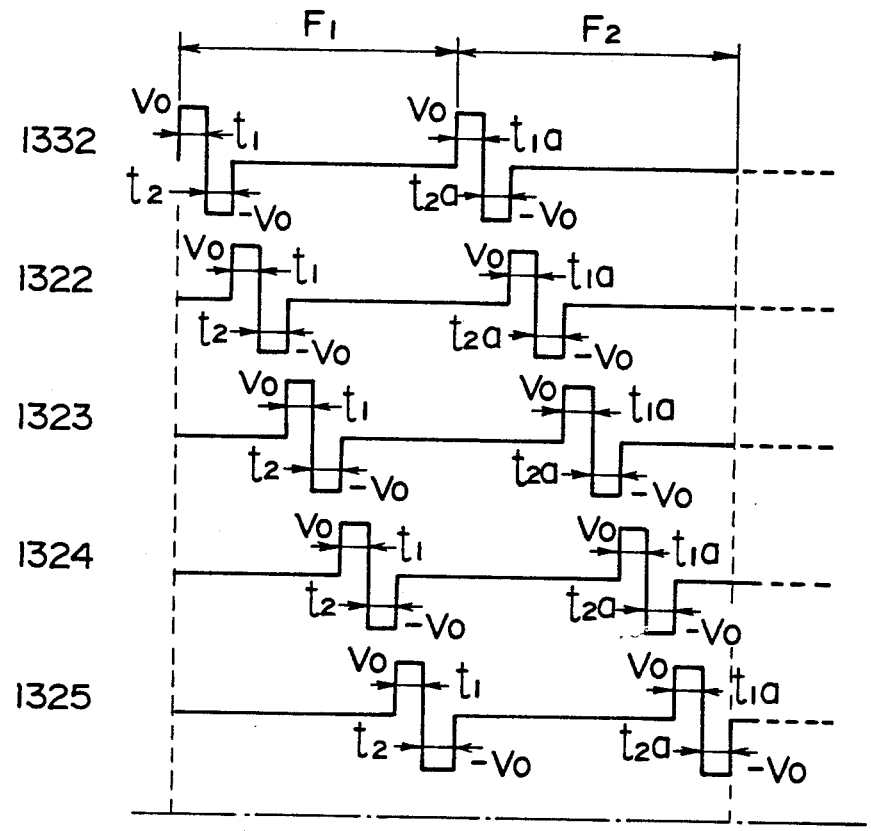

FIG. 16 is a schematic view of a matrix electrode construction applied to a liquid crystal-optical shutter. Reference numeral 161 denotes a picture element only at which the opposing surfaces are made transparent. Reference numeral 162 denotes a scanning electrode group, and 163 a signal electrode group.

Figure 17:
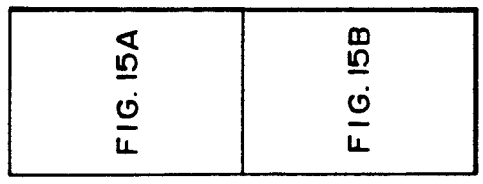
FIG. 17 (a combination of FIGS. 17A and 17B) shows voltage waveforms in time series in a further embodiment of the present invention.

FIG. 17 shows a yet further embodiment of the present invention in which the waveforms of a scanning signal applied to the scanning electrode group and the waveforms of an information signal applied to a signal electrode group are modified. As is clear from Figure 17, at a phase $t_1$ in a first frame $F_1$, a voltage of $-2V_0$ is applied to each picture element by line sequential scanning and a voltage $V_0$ is applied at a phase $t_2$. When $2V_0$ is applied, a nonlinear element connected in series to a picture element is driven into the ON state, but when $V_0$ is applied, the nonlinear element is driven into the OFF state, so that the state representing "white" at the phase $t_1$ is memorized and displayed in the first frame $F_1$. In the next second frame $F_2$ which is a writing time period, $2V_0$ in excess of a threshold level of a nonlinear element is applied to a picture element B at a phase $t_{2a}$ so that "black" is displayed. Thereafter, a voltage in excess of a threshold level of the nonlinear element is not applied to the picture element B (the linear element remains in the OFF state at $V_0$ or $-V_0$) so that "black" is memorized in the picture element B and displayed in the second frame $F_2$.

In the above-described embodiment, nonlinear elements having a threshold level of 5–20 V were obtained by varying design parameters (such as the area, the thickness of an insulating layer of nonlinear elements, etc.). Threshold levels at which a liquid crystal (DOBAMBC) used is driven into one electrically polarized state and the other electrically polarized state, respectively, are dependent on a selected pulse duration and have ranges. When the pulse duration was between 50–500 μsec., the threshold level was about 9–30 V. When $V_0$ was selected between 5–20 V under the above-described conditions, operations were satisfactory.

As described above, the difficulties encountered in the fabrication of nonlinear elements and the severe driving methods have hindered the conventional commercial liquid crystal devices from attaining a high picture element density. However, if a liquid crystal layer has two (ON or OFF) states (corresponding to two polarized states, respectively, of a ferroelectric liquid crystal) each having a memory or storage capability, the liquid crystal layer which is switched into, for instance, the ON state upon application of a voltage thereto remains in the ON state even after the applied voltage disappears so that the electrostatic capacitance of a nonlinear element may be equal to or less than that of a picture element liquid crystal and consequently it becomes possible to realize a high speed driving at a low driving voltage.

What is claimed is:

1. A liquid crystal device, comprising:
   a group of scanning electrodes;
   a group of signal electrodes intersecting the scanning electrodes;
   a ferroelectric liquid crystal having memorizable electrically polarized states interposed between the scanning electrodes and the signal electrodes, each of the intersections of the scanning electrodes and the signal electrodes defining a picture element; and
   a nonlinear element having a nonlinear voltage-current characteristic corresponding to each picture element.

2. The liquid crystal device according to claim 1, wherein said ferroelectric liquid crystal has two different electrically polarized states.

3. The liquid crystal device according to claim 1, wherein said ferroelectric liquid crystal is in a smectic phase.

4. The liquid crystal device according to claim 1, wherein said ferroelectric liquid crystal is in a chiral smectic phase.

5. The liquid crystal device according to claim 4, wherein said chiral smectic phase is C, H, I, J, K, G or F phase.

6. The liquid crystal device according to claim 1, wherein said nonlinear element has a lamination structure comprising a metal layer, an insulating layer, and a metal layer.

7. A driving method for a liquid crystal device of the type comprising a group of scanning electrodes, a group of signal electrodes intersecting the scanning electrodes, a ferroelectric liquid crystal having memorizable electrically polarized states interposed between the scanning electrodes and the signal electrodes, each of the intersections of the scanning electrodes and the signal electrodes defining a picture element, and a nonlinear element having a nonlinear voltage-current characteristic corresponding to each picture element, said driving method comprising:
   a first step in which a voltage in excess of a threshold level of one polarity is applied to the nonlinear elements corresponding to the picture elements, on a scanning electrode selected from said scanning electrode group so that said ferroelectric liquid crystal is driven into one electrically polarized state; and
   a second step in which a voltage in excess of a threshold level of the opposite polarity is applied to a nonlinear element selected in response to an information signal from the nonlinear elements corresponding to the picture elements on said selected scanning electrode so that said ferroelectric liquid crystal is driven into another electrically polarized state.

8. The driving method according to claim 7, wherein said first step is a step for applying a voltage to the scanning electrode.

9. The driving method according to claim 7, wherein while said first step is being accomplished on an N-th scanning electrode, said second step is being accomplished on an (N-1)-th scanning electrode.

10. The driving method according to claim 7, wherein said first step and said second step are sequentially accomplished on one scanning electrode, and then accomplished on a next scanning electrode.

11. A driving method for a liquid crystal device of the type comprising a group of scanning electrodes, a group of signal electrodes intersecting the scanning electrodes, a ferroelectric liquid crystal having memorizable electrically polarized states assuming either one of two electrically polarized states depending on an electric field applied thereto interposed between the scanning electrodes and the signal electrodes, each of the intersection of the scanning electrodes and the signal electrodes defining a picture element, and a nonlinear element having a nonlinear voltage current characteristic corresponding to each picture elemnet,
   said driving method comprising:
   a first phase in which a voltage in excess of a threshold level of one polarity is applied to nonlinear elements corresponding to predetermined picture elements on a scanning electrode selected from said scanning electrode group so that the ferroelectric liquid crystal corresponding to said predetermined picture elements is driven into one polarized state; and
   a second phase in which a voltage in excess of a threshold level of the opposite polarity is applied to the nonlinear elements corresponding to the picture elements different from said predetermined picture elements on said scanning electrode so that the ferroelectric liquid crystal corresponding to said different picture elements is driven into another polarized state.

12. The driving method according to claim 11, wherein an electrical signal having phase of different voltage is applied to a scanning electrode selected from said scanning electrode group, and
electrical signals of different voltages are applied to selected and not-selected signal electrodes, respectively, of said signal electrode group.

13. The driving method according to claim 11, wherein an electrical signal having phases of different voltage polarities is applied to a scanning electrode selected from said scanning electrode group, and
electrical signals of different voltage polarities are applied to selected and not-selected signal electrodes, respectively, of said signal electrode group.

14. The driving method according to claim 11, wherein said ferroelectric liquid crystal is a smectic phase liquid crystal.

15. The driving method according to claim 14, wherein said smectic phase liquid crystal is a chiral smectic phase liquid crystal.

16. The driving method according to claim 15, wherein said chiral smectic phase liquid crystal is in a liquid crystal phase in which no helical structure is formed.

17. The driving method according to claim 15, wherein said chiral smectic phase liquid crystal is in C, H, I, J, K, G or F phase.

18. A driving method for a liquid crystal device of the type comprising a group of scanning electrodes, a group of signal electrodes intersecting the scanning electrodes, a ferroelectric liquid crystal having memorizable electrically polarized states interposed between the scanning electrodes and the signal electrodes, each of the intersections of the scanning electrodes and the signal electrodes defining a picture element, and a nonlinear element having a nonlinear voltage-current characteristic corresponding to each picture element, said driving method comprising:
a first stage in which a voltage in excess of a threshold level of one polarity is applied by line sequential scanning to the nonlinear elements corresonding to the picture elements on a scanning electrode selected from said scanning electrode group so that said ferroelectric liquid crystal is driven into one electrically polarized state; and
a second stage in which a voltage in excess of a threshold level of the opposite polarity is applied by line sequential scanning to a nonlinear element selected from the nonlinear elements corresponding to the picture elements on said scanning electrode so that said ferroelectric liquid crystal is driven into another electrically polarized state.

19. The driving method according to claim 18, wherein said ferroelectric liquid crystal has two different electrically polarized states.

20. The driving method according to claim 18, wherein said ferroelectric liquid crystal is in a smectic phase.

21. The driving method according to claim 18, wherein said ferroelectric liquid crystal is in a chiral smectic phase.

22. The driving method according to claim 21, wherein said chiral smectic phase is C, H, F, I, J, K or G phase.

23. The driving method according to claim 22, wherein said chiral smectic phase has a non-helical structure.

24. The driving method according to claim 18, wherein said nonlinear element has a lamination structure comprising a metal layer, an insulating layer and a metal layer.

25. A driving method for a liquid crystal device of the type comprising a group of scanning electrodes, a group of signal electrodes intersecting the scanning electrodes, a ferroelectric liquid crystal having memorizable electrically polarized states interposed between the scanning electrodes and the signal electrodes, each of the intersections of the scanning electrodes and the signal electrodes defining a picture element, and a nonlinear element having a nonlinear voltage-current characteristic corresponding to each picture element, said driving method comprising the steps of:
(a) applying voltage in excess of a threshold level of one polarity to the nonliner elements corresponding to the picture elements connected to said scanning electrode group so that said ferroelectric liquid crystal is driven into one electrically polarized state; and
(b) sequentially selecting a scanning electrode among said scanning electrode groups and applying a voltage in excess of a threshold level of the opposite polarity to a nonlinear element selected in response to an information signal from the nonlinear elements corresponding to the picture elements on said selected scanning electrode, so that said ferroelectric liquid crystal is driven into another electrically polarized state.

26. The driving method according to claim 25, wherein said ferroelectric liquid crystal is a smectic phase liquid crystal.

27. The driving method according to claim 26, wherein said smectic phase liquid crystal is a chiral smectic phase liquid crystal.

28. The driving method according to claim 27, wherein said chiral smectic phase liquid crystal is in a liquid crystal phase in which no helical structure is formed.

29. The driving method according to claim 27, wherein said chiral smectic phase liquid crystal is in a C, H, I, J, K, G, or F phase.

30. In a liquid crystal apparatus comprising: a liquid crystal device comprising a group of scanning electrodes, a group of signal electrodes intersecting the scanning electrodes, and a ferroelectric liquid crystal having memorizable electrically polarized states interposed between the scanning electrodes and the signal electrodes, each intersection of the scanning electrodes and the signal electrodes defining a picture element; and voltage application means for applying a voltage to the picture elements, the improvement comprising:
a nonlinear element having a nonlinear voltage-current characteristic connected to each picture element; and
wherein said voltage application means comprises means for sequentially applying a scanning selection signal to the scanning electrodes, applying a voltage in excess of a threshold level of one phase and polarity to the nonlinear elements corresponding to the picture elemnts on a selected scanning electrode, and applying a voltage in excess of a threshold level of another phase and polarity to a nonlinear element corresponding to at least one of the picture elements on the selected scanning electrode.

31. The liquid crystal apparatus according to claim 30, wherein said voltage application means simultaneously applies a scanning selection signal to at least two scanning electrodes, wherein said voltage application means applies a voltage in excess of a threshold level of one polarity to the nonlinear elements corresponding to the picture elements of a preceding scanning electrode of said at least two scanning electrodes, and wherein said voltage application means applies a voltage in excess a threshold level of another polarity to a nonlinear element corresponding to at least one of the picture elements of a succeeding scanning electrode.

32. The liquid crystal apparatus according to claim 31, wherein said voltage application means applies the voltage of one polarity and another polarity at the same time.

33. The liquid crystal apparatus according to claim 30, wherein said ferroelectric liquid crystal is a smectic phase liquid crystal.

34. The liquid crystal apparatus according to claim 33, wherein said smectic phase liquid crystal is a chiral smectic phase liquid crystal.

35. The liquid crystal apparatus according to claim 34, wherein said chiral smectic phase liquid crystal is in a liquid crystal phase in which no helical structure is formed.

36. The liquid crystal apparatus according to claim 34, wherein said chiral smectic phase liquid crystal is in a C, H, I, J, K, G or F phase.

37. In a liquid crystal apparatus, comprising: a liquid crystal device comprising a group of scanning electrodes, a group of signal electrodes intersecting the scanning electrodes, and a ferroelectric liquid crystal having memorizable electrically polarized states interposed between the scanning electrodes and the signal electrodes, each intersection of the scanning electrodes and the signal electrodes defining a picture element; and voltage application means for applying a voltage to the picture elements, the improvement comprising:
a nonlinear element having a nonlinear voltage-current characteristic connected to each picture element;
wherein said voltage application means includes means for sequentially selecting the scanning electrodes and applying a voltage in excess of a threshold level of one phase and polarity to a nonlinear element corresponding to a selected picture element on a selected scanning electrode and applying a voltage in excess of a threshold level of another phase and polarity to a nonlinear element corresponding to another picture element on the selected scanning electrode.

38. The liquid crystal apparatus according to claim 37, wherein the phases for applying the voltage of one polarity and the voltage of another polarity are consecutive with respect to time.

39. The liquid crystal apparatus according to claim 37, wherein said ferroelectric liquid crystal is a smectic phase liquid crystal.

40. The liquid crystal apparatus according to claim 39, wherein said smectic phase liquid crystal is a chiral smectic phase liquid crystal.

41. The liquid crystal apparatus according to claim 40, wherein said chiral smectic phase liquid crystal is in a liquid crystal phase in which no helical structure is formed.

42. The liquid crystal apparatus according to claim 40, wherein said chiral smectic phase liquid crystal is in a C, H, I, J, K, G or F phase.

43. In a liquid crystal apparatus, comprising: a liquid crystal device comprising a group of scanning electrodes, a group of signal electrodes intersecting the scanning electrodes, and a ferroelectric liquid crystal having memorizable electrically polarized states interposed between the scanning electrodes and the signal electrodes, each intersection of the scanning electrodes and the signal electrodes defining a picture element; and voltage application means for applying a voltage to the picture elements, the improvement comprising:
a nonlinear element having a nonlinear voltage-current characteristic connected to each picture element;
wherein said voltage application means includes means for applying a voltage in excess of a threshold level of one polarity to the nonlinear elements corresponding to the picture elements on the scanning electrodes, and for thereafter sequentially selecting the scanning electrodes and applying a voltage in excess of a threshold level of another polarity to a nonlinear element corresponding to at least one of the picture elements on a selected scanning electrode.

44. The liquid crystal apparatus according to claim 43, wherein said voltage application means applies a voltage of one polarity to the nonlinear elements while sequentially selecting the scanning electrode.

45. The liquid crystal apparatus according to claim 43, wherein said ferroelectric liquid crystal is a smectic phase liquid crystal.

46. The liquid crystal apparatus according to claim 45, wherein said smectic phase liquid crystal is a chiral smectic phase liquid crystal.

47. The liquid crystal apparatus according to claim 46, wherein said chiral smectic phase liquid crystal is in a liquid crystal phase in which no helical structure is formed.

48. The liquid crystal apparatus according to Claim 46, wherein said chiral smectic phase liquid crystal is in a C, H, I, J, K, G or F phase.

* * * * *

UNITED STATES PATENT AND TRADEMARK OFFICE
CERTIFICATE OF CORRECTION

PATENT NO. : 4,712,872

DATED : December 15, 1987

INVENTOR(S) : J. Kanbe, et al.

It is certified that error appears in the above-identified patent and that said Letters Patent is hereby corrected as shown below:

COLUMN 1

Line 30, "Metal)structure"
        should read --Metal) structure--.
    Line 48, "Devives" should read --Devices--.

COLUMN 2

Line 8, "present drawings." should read
        --present invention taken in conjunction
        with the accompanying drawings.--
    Line 33, "preferable" should read --preferably--.

COLUMN 3

Line 4, "latitute" should read --latitude--.

COLUMN 4

Line 7, "that" should read --so that--.
    Line 25, "Submicro Second" should read
        --Submicrosecond--.
    Line 29, "crysals" should read --crystals--.
    Line 32, "crystals" should read --crystal--.

UNITED STATES PATENT AND TRADEMARK OFFICE
CERTIFICATE OF CORRECTION

PATENT NO. : 4,712,872

DATED : December 15, 1987

INVENTOR(S) : J. Kanbe, et al.

It is certified that error appears in the above-identified patent and that said Letters Patent is hereby corrected as shown below:

```
Lines 35-6, "cinnam-/age" should read
            --cinnam-/ate--.
Line 38, "liquie" should read --liquid--.
Line 50, "21a are" should read --21a and are--.
Line 58, "an" should read --and--.
Line 66, "cross" should read --across--.
```

COLUMN 5

```
Line 8, "p" should read --P--.
Line 29, "vaguness" should read --vagueness--.
```

COLUMN 6

```
Line 14, "element as" should read --element.  As--.
Line 15, "FIG. 1, Reference" should read
         --FIG. 5, reference--.
Line 18, ""black":," should read --"black",--.
Line 41, "he" should read --the--.
```

UNITED STATES PATENT AND TRADEMARK OFFICE
CERTIFICATE OF CORRECTION

PATENT NO. : 4,712,872

DATED : December 15, 1987

INVENTOR(S) : J. Kanbe, et al.

It is certified that error appears in the above-identified patent and that said Letters Patent is hereby corrected as shown below:

COLUMN 7

Line 14, "ia" should read --is--.
    Lines 17-8, "elec-/trode" should read
        --elec-/trodes--.
    Line 21, "20" should read --so--.
    Line 32, "give" should read --given--.

COLUMN 9

Line 23, "element" should read --element,--.
    Line 29, "liquie" should read --liquid--.
    Line 51, "liquie" should read --liquid--.

COLUMN 10

Line 10, "the all" should read --all the--.
    Lines 45-6, "depend-/ing" should read
        --dependent--.

UNITED STATES PATENT AND TRADEMARK OFFICE
CERTIFICATE OF CORRECTION

PATENT NO. : 4,712,872

DATED : December 15, 1987

INVENTOR(S) : J. Kanbe, et al.

It is certified that error appears in the above-identified patent and that said Letters Patent is hereby corrected as shown below:

COLUMN 12

Lines 52-3, "inter-/section" should read
        --inter-/sections--.
    Line 55, "voltage current" should read
        --voltage-current--.
    Line 56, "elemnet," should read --element,--.

COLUMN 13

Line 8, "voltage" should read --voltages--.
    Line 47, "corresonding" should read
        --corresponding--.

COLUMN 14

Line 68, "elemnts" should read --elements--.

COLUMN 15

Line 54, "electrode" should read --electrode,--.

Signed and Sealed this

Twentieth Day of September, 1988

Attest:

DONALD J. QUIGG

Attesting Officer      Commissioner of Patents and Trademarks